March 31, 1936. C. H. DAVIS, JR 2,035,947
CONNECTER
Filed Nov. 30, 1931 3 Sheets-Sheet 1
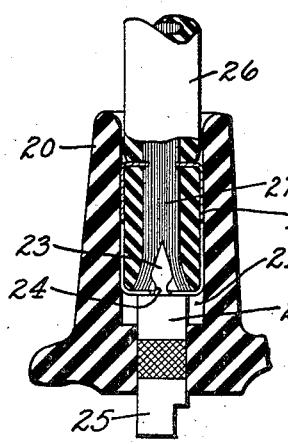
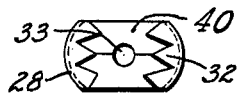
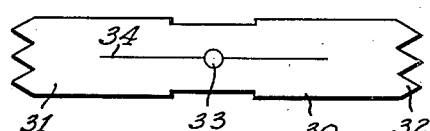
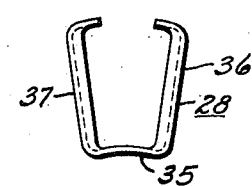
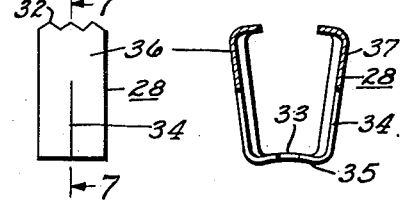
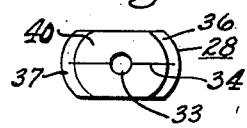
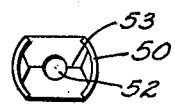
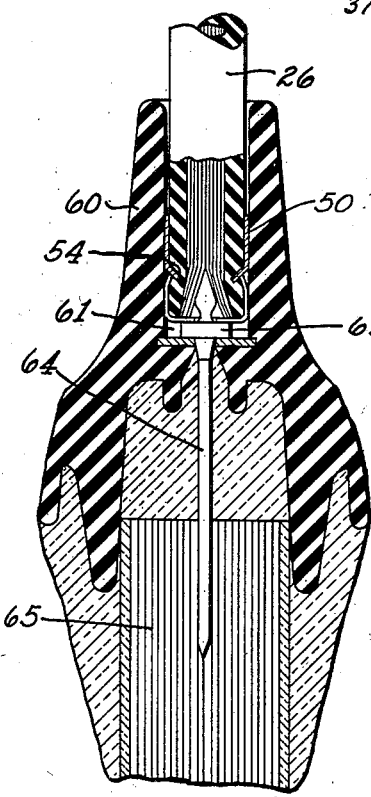
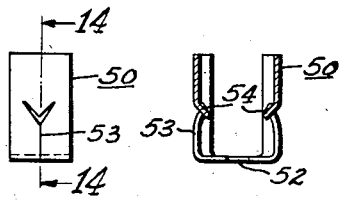
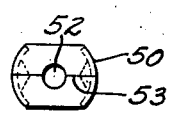
Inventor
Charles Hall Davis, Jr.
By Spencer, Hardman & Fehr
His Attorneys March 31, 1936.   C. H. DAVIS, JR   2,035,947
CONNECTER
Filed Nov. 30, 1931    3 Sheets-Sheet 2
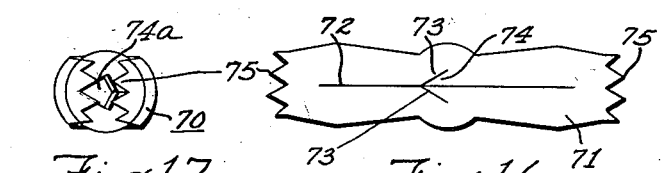
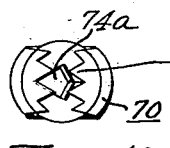
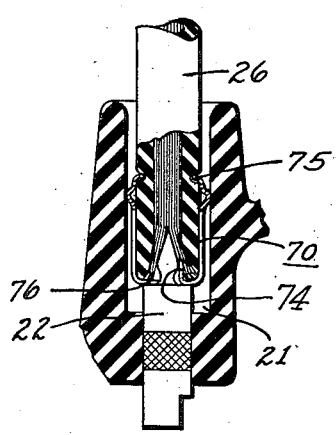
Fig.17.  Fig.16.
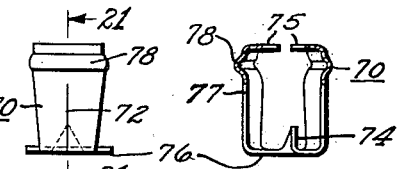
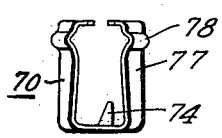
Fig.18.  Fig.19.  Fig.21.
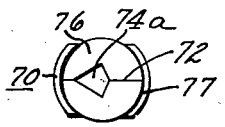
Fig.20.
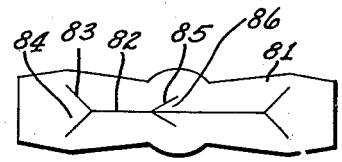
Fig.23.
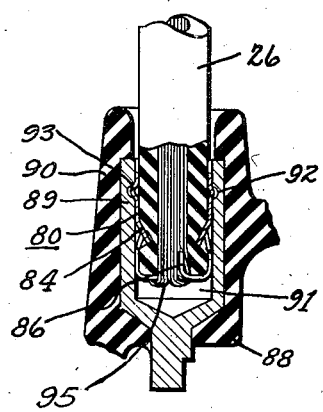
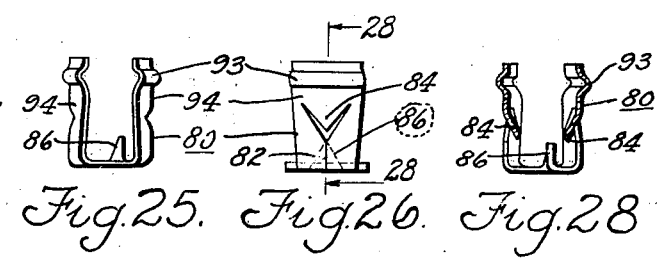
Fig.22.  Fig.25.  Fig.26.  Fig.28.
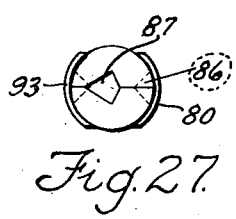
Fig.27.
Inventor
Charles Hall Davis, Jr.
By
Spencer, Hardman & Fehr
His Attorneys March 31, 1936.  C. H. DAVIS, JR  2,035,947
CONNECTER
Filed Nov. 30, 1931   3 Sheets-Sheet 3
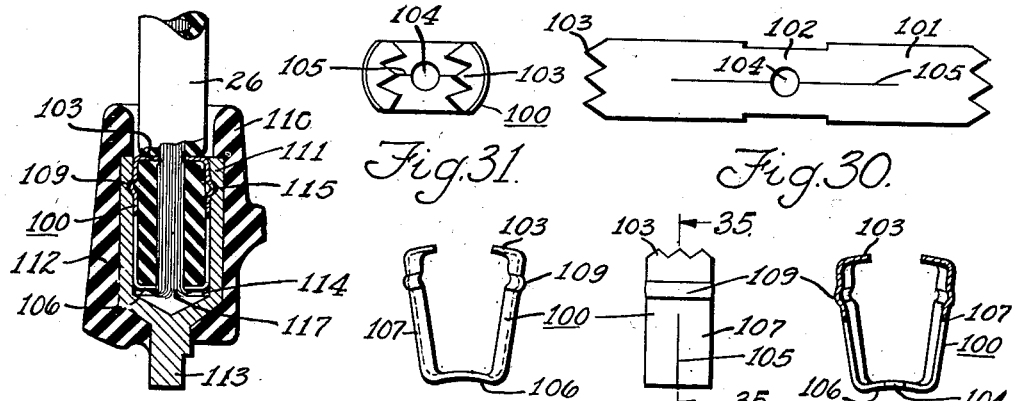
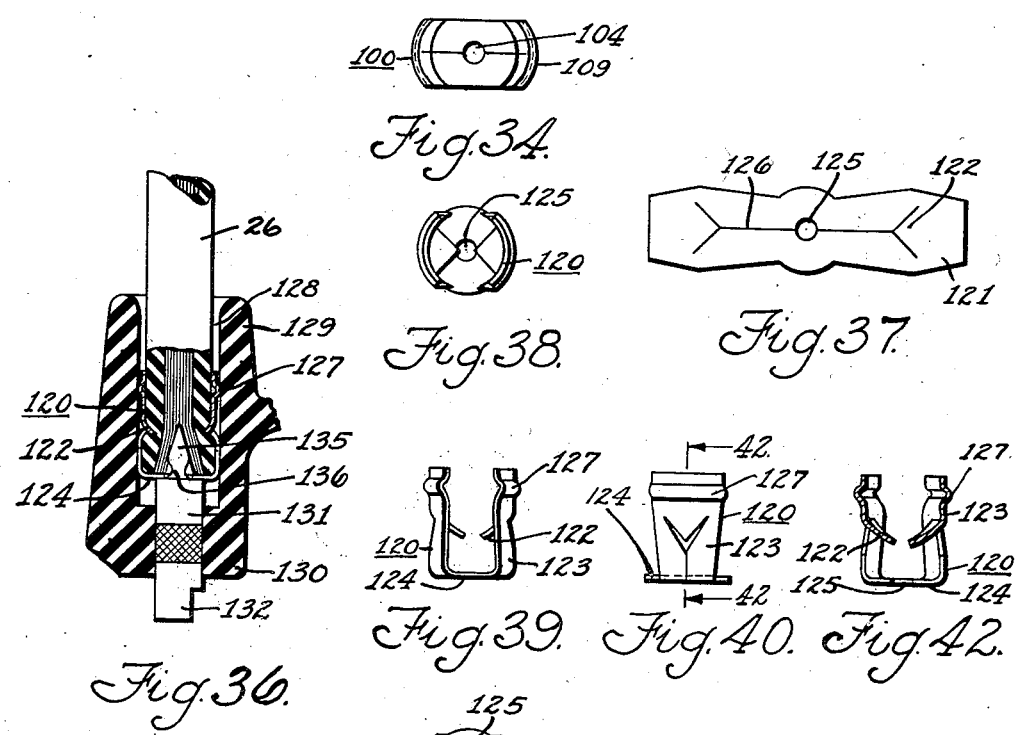
Inventor
Charles Hall Davis, Jr.
By Spencer Hardman & Fehr
His Attorneys Patented Mar. 31, 1936

2,035,947

UNITED STATES PATENT OFFICE 2,035,947

CONNECTER

Charles Hall Davis, Jr., Anderson, Ind., assignor, by mesne assignments, to General Motors Corporation, Detroit, Mich., a corporation of Delaware Application November 30, 1931, Serial No. 577,955

7 Claims. (Cl. 173—269)

This invention relates to connecters for electrical cables, such as those used in ignition systems for internal combustion engines.

Among the objects of the present invention is to provide a novel form of connecter plug having inwardly extending piercing members which permit the ready insertion of a cable in a plug, but becomes fixed to the cable when the cable is moved in the opposite direction, thus forming a connecter whereby a good electrical connection can be established between the cable and a terminal block, such, for example, distributor heads, ignition coils and the like, as found on automobiles; and to provide a connecter that may be detached quickly from the terminal block or connected quickly with the terminal block with the assurance that a positive, firm and reliable electrical connection will be attained. This is accomplished by providing a terminal connecter plug comprising a U-shaped member having a centrally apertured yoke, the yoke being bifurcated on each side of the aperture to form jaws and the bifurcation extending a considerable way into the branches of the U-shaped member. This construction permits the spreading of the jaws of the yoke member when sufficient pressure is applied to attach the plug to a terminal having a portion that is larger in diameter than the aperture in the yoke.

Further objects and advantages of the present invention will be apparent from the following description, reference being had to the accompanying drawings wherein a preferred embodiment of one form of the present invention is clearly shown.

In the drawings:

Fig. 1 is a fragmentary sectional view of a terminal block such as a distributor head for ignition apparatus, constructed to cooperate with the connecter included in the present invention.

Fig. 2 is a top plan view of a blank prior to forming the connecter of the present invention.

Fig. 3 is a top plan view of the connecter shown in section in Fig. 1.

Figs. 4, 5, 6 are side, end and bottom views respectively of the connecter.

Fig. 7 is a sectional view taken on the line 7—7 of Fig. 5.

Fig. 8 is a fragmentary sectional view similar to Fig. 1, showing another form of the improved connecter plug, the connecter being used with a terminal of an ignition coil.

Fig. 9 is a plan view of a blank prior to forming the connecter shown in section in Fig. 8.

Figs. 10, 11, 12 and 13, are top, side, end and bottom views respectively, of the connecter shown in section in Fig. 8.

Fig. 14 is a sectional view taken on the line 14—14 of Fig. 12.

Fig. 15 is a sectional view similar to Fig. 1 showing another form of an improved connecter.

Fig. 16 is a top plan view for blank prior to forming the connecter as shown in Fig. 15.

Figs. 17, 18, 19, 20 are top, side, end and bottom views respectively, of the connecter shown in section in Fig. 15.

Fig. 21 is a sectional view taken on the line 21—21 of Fig. 19.

Fig. 22 is a sectional view showing another form of an improved connecter such as a distributer head having a metal insert embedded therein.

Fig. 23 is a top plan view of a blank used to form a connecter shown in section in Fig. 22.

Figs. 24, 25, 26 and 27 are top, side end and bottom views respectively of the connecter shown in Fig. 22.

Fig. 28 is a sectional view taken on the line 28—28 of Fig. 26.

Fig. 29 is a sectional view showing another form of a connecter.

Fig. 30 is a top plan view of a blank used for making a connecter shown in section in Fig. 29.

Figs. 31, 32, 33, and 34 are top, side, end and bottom views respectively of the connecter shown in Fig. 29.

Fig. 35 is a sectional view taken on the line 35—35 of Fig. 33.

Fig. 36 is a sectional view showing another form of the present invention.

Fig. 37 is a top plan view of a blank used for forming a connecter illustrated in section in Fig. 36.

Figs. 38, 39, 40 and 41 are top, side, end and bottom views respectively of the connecter shown in section in Fig. 36.

Fig. 42 is a sectional view taken on the line 42—42 of Fig. 40.

Referring to the drawings and particularly to Figs. 1 to 7 inclusive, 20 designates a terminal block or distributor head for an ignition apparatus provided with a plurality of sockets 21, only one socket being shown. Each socket of the distributor head is adapted to receive a post or terminal conductor 22 having a pointed end or portion 23. This pointed portion is provided with an annular groove designated by numeral 24. The lower portion 25 of the post cooperates with a rotor carrying a brush member (not shown).

In order to connect the pointed portion 23 with a cable 26 having a conducting element or wire strands 27 covered with insulating material, there is provided a terminal connecter plug or ferrule designated as a whole by the numeral 28.

The connecter 28 is shaped from a sheet metal punching or blank 30, shown in developed plan form in Fig. 2. The blank in general comprises a main portion 31 having prongs or fingers 32, an aperture 33 communicating with slits 34. The blank may be readily shaped into a U-shaped member as shown in Figs. 3 to 7 inclusive. When the blank is so shaped, it forms the terminal connecter 28 which is adapted to be attached to an end of the cable 26.

The connecter 28 comprises a resilient bifurcated base or yoke 35 having the aperture 33 substantially centrally located therein, the base is formed integral with branches 36 and 37 having the prongs 32 bent inwardly so as to bite into the insulation of the cable 26 to prevent relative longitudinal movement of the connecter 28 with respect to the cable 26.

To attach the insulated wire 27 to the pointed portion of the conductor 23, the wire 27 is cut off square at one end and that end is inserted between the branches 36 and 37 of the connecter 28. The square end bears against the yoke 35. The cable and the connecter are inserted into the socket 21 and are moved inwardly until the bifurcated base or yoke 35 passes over the pointed portion 23 into the annular groove 24. This movement will cause the end or portion 23 of the conductor 22 to pass through the aperture 33 and wedge the strands of the wire 27 apart forming an electrical connection between the wire strands 27 and the terminal 22.

It will be observed from Figs. 2, 3, 5 and 7, that the slots 34 extend across the base 35 communicating with the aperture 33 to form jaws or clamps 40, and the slits also extend a considerable way in the branches 36 and 37, thus forming a hinge so that the jaws of the base 35 can be moved away from each other under tension. This construction will permit the jaws 40 of the base 35 to spread apart when the connecter 28 is being forced over the end 23 of the terminal 22. The end 23 is provided with a portion having a larger diameter than the aperture 33 of the base 35. As soon as the jaws 40 pass over the large diameter of the end 23, the jaws 40 will snap back into the groove 24 toward a normal position and lock the same around the end 23, as shown in Fig. 1, and hold the connecter plug 28 and cable in a good electrical connection with the insert 22.

In another form of the invention shown in Figs. 8 to 14 inclusive, the connecter 50 is shaped from a blank 51 having an aperture 52 and bifurcated to form straight slits 53 and V-shaped slits 54. When the blank is deformed to form a U-shaped member, as illustrated in Figs. 11 and 14, the V-shaped portions or prongs 54 are bent inwardly and extend downwardly as viewed in Fig. 14. With the connecter in the form above described, it will be noted that the prongs 54 are bent inwardly and downwardly, so that when the end of the cable is inserted or forced into the connecter 50, the insulating covering of the cables will be permitted to pass the ends of the prongs 54, but any tendency to withdraw the cable from the plug will cause the prongs 54 to bite into the insulating cover, thus preventing the cable from being detached from the connecter plug and forming a unitary part of the end of the cable.

This structure of the connecter 50 is shown in connection with an ignition coil, of which a fragment is shown in Fig. 8. A non-conducting body or cap 60 is provided with a socket 61 adapted to receive the terminal connecter 50 and the cable 26. The connecter cooperates with a nail 63 which is forced or driven through previously in the bottom of the socket 61 and in the body 60. A shank 64 of the nail extends into a bundle of wire 65 which are connected to the secondary winding (not shown) of the coil.

In the form of the invention shown in Fig. 15 to 21 inclusive, the connecter 70 is shaped from a blank, the blank being severed to form a straight slit 72 and a plurality of slits 73 disposed at an angle intermediate the straight slit 72 to form points or prongs 74. The ends of the blank are provided with piercing fingers 75. When the blank 71 is formed into a U-shaped member, as illustrated in Figs. 18 and 20, the points 74 are bent inwardly and upwardly within the interior of the connecter to form an aperture 74a and the fingers 75 are bent inwardly. It will be observed that when the end of the cable is inserted in the connecter plug 70, the points 74 are located centrally, so that they will be forced inwardly into or among the wire strands of the cable 26. The fingers 75 are adapted to pierce the cable to retain the cable within the interior of the connecter plug 70. The connecter plug 70 is provided with a bridge 76, the bridge cooperating with the insert 22 in the same manner as the bridge member 40 cooperates with the insert 22 described in the first form of the invention.

The bridge 76 connects two branch members 77 to engage the outer circumference of the insulation of the cable 26. These branches are provided with arcuate ribs 78 adapted to be received by the sleeve 21 in which the prongs or fingers 75 are forced to bite into the insulation as illustrated in Fig. 15.

In the form of the invention shown in Figs. 22 to 28 inclusive, the connecter 80 is shaped from a metal blank 81, the blank being severed suitably to provide straight slits 82, V-shaped slits 83 to form prongs 84 and slits 85 disposed at an angle intermediate the straight slit 82 to form points 86. When the blank 81 is formed into a U-shaped member as shown in Figs. 25 and 28, the points 86 are bent inwardly and upwardly to form an aperture 87 in a similar manner described in the form shown in Figs. 15 to 21 inclusive. The prongs 84 are bent inwardly to pierce the cable 26 to retain the same within the interior of the connecter plug 80 and any tendency to withdraw the cable from the plug will cause the prongs 84 to bite into the insulating cover, thus preventing the cable from being detached from the connecter plug.

This construction of the connecter plug 80 is used with a distributor head 88 having a metallic insert 89 embedded with a socket 90. The insert 89 is provided with a recess 91 having an internal annular groove 92 adapted to receive arcuate ribs 93 formed on the side branches 94 of the connecter plug 80. It will be apparent when the end of the cable is inserted within the plug 80, the points 86, located centrally on the bridge member of the plug, will be forced into the wire strands of the cable. Some of the wire strands may project through the aperture 87 and may be bent over, as at 95, and soldered to the bridge member if deemed necessary or desirable.

In the form shown in Figs. 29 to 35 inclusive, a connecter 100 is made from a metal blank 101, the blank comprises a main body portion 102 having ends provided with piercing member 103, and an aperture 104. The body 101 is bifurcated as at 105 and communicates with the aperture 104. The blank is readily shaped into a U-shaped member or the connecter 100 which comprises a split resilient yoke 106 and brances 107. The piercing members are bent inwardly as illustrated in Figs. 31 and 32. The branches 107 are provided with ribs 109 interposed between the points 103 and the yoke 106.

The connecter 100 is adapted to be used with a distributor head 110 having a metallic insert 111 embedded in a sleeve 112. The insert has a post 113 and has a recess 114 provided with an annular groove 115 adapted to receive the ribs 109 of the connecter 100. To attach a cable 26 to the connecter 100, the cable is stripped of a portion of its insulation, so that the strand wires will pass through the apertures 104 and bend over as at 117 to be electrically connected with the connecter 100. The bent over portion may be soldered to the bridge or yoke 106 if desirable.

When the cable and connecter are inserted together in the recess 114, the ribs 109 will cause the points 103 to bite into the insulation of the cable to retain the cable within the interior of the connecter 100. When the connecter is inserted in the socket, the ribs 109 will snap into the annular groove 115 formed in the metal insert 111 to normally hold the plug connecter 100 and the attached cable within the socket, yet permitting the unitary detachment thereof by a strong manual pull of the cable.

In the form of the invention shown in Figs. 36 to 42 inclusive, the connecter 120 is also made from a single sheet metal blank 121 bent into proper form. In this form however, the piercing points 122 are located intermediate the bed branches 123 which holds the cable within the interior of the connecter. The connecter is provided with a circular base or yoke 124 provided with a hole 125 and split as at 126 to provide a split yoke connecting the branches which will engage the insulation of the conductor cable. The branches are provided with ribs 127 adapted to engage the inner circumference of a recess 128 of a sleeve 129 provided on the top of a distributor head 130. The recess receives a pointed conductor 131 having a post 132 which cooperates in a well known manner with a distributor rotor driven by an engine operated shaft (not shown).

When it is desired to connect the cable to the insert 131, the cable is forced inwardly into the connecter and passes by the piercing points 122 to engage the yoke 124. When the connecter is forced into the recess 128, the ribs 127 will force the points 122 into the insulation so that an opposite pull of the cable will cause the points to dig into the insulation and fix the connecter 120 to the end of the cable. Any further withdrawal action on the cable will cause the same to draw the connecter with it as a unitary part. When the connecter is forced downward into the recess the pointed end 135 will pass through the aperture and spread the strands of wires apart so as to establish an electrical connection between the insert 131 and the conductive part of the cable. In forcing the connecter over the end 135, the jaws of the yoke are forced outwardly, for the reason that the end 135 is provided with a portion larger in diameter than the aperture 125. As soon as the jaws of the yoke pass over the enlarged portion of the end 135, the jaws tend to return towards its normal position due to the resiliency within the yoke member. The end 135 is provided with an annular groove 136 which allows the jaws of the yoke to lock the connecter upon the insert 131, and also to maintain a good electrical connection between the conductive strands of the cable and insert.

While the form of embodiment of the present invention as herein disclosed, constitutes a preferred form, it is to be understood that other forms might be adopted, all coming within the scope of the claims which follow.

What is claimed is as follows:

1. An electrical connecter comprising in combination, a connecter for an end of a cable comprising a resilient split yoke having an opening and having branches provided with cable insulation piercing members, and a pointed post entering the opening in the yoke of said connecter, said post having a part to spread said yoke as the part is pushed into the cable end and having a recess located adjacent the opening in the yoke when the post has been pushed into final position whereby the portions of the yoke at the sides of the split are permitted to move toward the post.

2. An electrical connecter comprising, in combination, a connecter for an end of a cable comprising a resilient yoke with an opening through which a conducting element of a cable extends and having branches having means for piercing the insulation on said cable; and a socket inclosing a pointed post entering the opening in said yoke, said post having a portion larger than said aperture to spread said yoke and having a smaller portion to receive said yoke when the connecter and cable are inserted into said socket and holding same in position.

3. A terminal connecter for an insulated cable insertable in a socket comprising, in combination, a resilient yoke having an aperture and having a bifurcating slot in communication with the aperture to provide gripping members, said yoke adapted to be engaged with an end of a conducting element; branch portions extending angularly from the yoke to embrace the cable, means on the branches for piercing the insulation; a socket and a post located within the socket having a portion to spread the gripping members of the yoke and a portion to receive and permit said gripping members to return toward a normal position.

4. An electrical connection comprising in combination; a socket member; a post located within said socket having an enlarged portion and a reduced portion; a plug member adapted to fit into said socket member, the plug member being made of sheet material and adapted to be attached to the end of an electrical cable, said plug provided with a bifurcated yoke having a prong adapted to be bent angularly with respect to said yoke to engage the conducting element of the cable and forming an opening in said yoke of less diameter than the enlarged portion of said post, said plug having branches extending angularly from said yoke to embrace said cable, the branches having fingers for piercing the insulation of the cable for restraining relative longitudinal movement between said plug and cable, whereby said plug is forced into the socket, the enlarged portion of the post will cause the yoke member to spread apart, and said yoke member will return toward its normal position when it engages the reduced portion of the post to yieldingly hold the plug in position with the socket.

5. A connecter for an insulated cable adapted to be inserted into a socket comprising, in combination; a socket; a terminal post provided with a head portion located within the socket; a cable; a cap member having a base provided with an aperture and having a bifurcating slot in communication with the aperture through which the head of the post extends to yieldingly maintain the base on the post by its own resiliency; branch members extending angularly from the base and adapted to embrace the cable; means on the branch member for piercing the cable; and ribs on the branch members causing the piercing means to pinch the cable when in engagement with the socket.

6. A terminal connecter for an insulated cable insertable in a socket comprising, in combination; a yoke having an aperture and having a slot in communication with the aperture to provide yieldable portions, said yoke adapted to be engaged with an end of a conducting element; arms extending from the yoke to embrace a cable; means on said arms for piercing the insulation of the cable; a socket; and a post located within the socket having a head to spread the yieldable portions of the yoke, and said post having a reduced portion to receive and permit the yieldable portions to return toward a normal position.

7. An electrical terminal for an insulated conductor, comprising in combination; a cap member for an end of the insulated conductor comprising a resilient base having an opening, a bifurcating slot in communication with the opening to provide a plurality of yieldable jaws, means for making electrical contact with the conductor, and branches provided with means for piercing the insulation of the conductor; and a socket enclosing a conducting spear head, said head adapted to extend through the opening of the resilient base to form a positive electrical connection between the head and the conductor, said jaws yieldingly retaining the base below the spearhead to maintain the electrical connection of the head and conductor and restraining longitudinal movement between same.

CHARLES HALL DAVIS, Jr.